United States Patent [19]
Kimura

[11] Patent Number: 4,547,815
[45] Date of Patent: Oct. 15, 1985

[54] DETACHABLY CONNECTIBLE VIDEO CAMERA VIDEO RECORDER

[75] Inventor: Takashi Kimura, Tokyo, Japan

[73] Assignee: Canon Kabushiki Kaisha, Tokyo, Japan

[21] Appl. No.: 538,837

[22] Filed: Oct. 4, 1983

Related U.S. Application Data

[63] Continuation of Ser. No. 208,340, Nov. 19, 1980, abandoned.

[30] Foreign Application Priority Data

Nov. 27, 1979 [JP] Japan .......................... 54-163978[U]

[51] Int. Cl.⁴ ............................................. H04N 5/78
[52] U.S. Cl. .................................... 358/335; 358/906
[58] Field of Search ................ 360/33, 33.1; 358/127, 358/335, 906, 229; 369/12; 352/242–243; 354/81–82

[56] References Cited

U.S. PATENT DOCUMENTS

| | | | |
|---|---|---|---|
| 2,771,560 | 11/1956 | Creiman | 369/12 |
| 3,833,758 | 9/1974 | Ferrari | 360/9 |
| 4,050,796 | 9/1977 | Komine | 352/243 |
| 4,095,244 | 6/1978 | Yokoyama et al. | 354/82 |
| 4,163,256 | 7/1979 | Adcock | 358/127 |
| 4,204,236 | 5/1980 | Nakasho | 369/11 |

FOREIGN PATENT DOCUMENTS 52-58315  5/1977  Japan .................................... 360/33

OTHER PUBLICATIONS

Research Disclosure, Jun. 1979, No. 182, pp. 313–316.

Primary Examiner—Robert L. Richardson
Attorney, Agent, or Firm—Toren, McGeady, Stanger, Goldberg, & Kiel

[57] ABSTRACT

A portable magnetic picture recording system includes a video camera and a video tape recorder. The video tape recorder is provided with an attachment portion for fixed engagement with the video camera, and a connector portion for electrical coupling with the video camera. By electrically connecting the connector portion with a terminal portion of the video camera, the video camera and the video tape recorder become electrically coordinated with each other. The video camera is constructed to be removably attachable to the tape recorder at the attachment portion for fixed engagement with the tape recorder, so that the photographer is able to choose between a first working mode where the camera is attached to the recorder so that they are used together as a single device, and a second working mode where the camera and the recorder are used separated from each other.

6 Claims, 14 Drawing Figures

DETACHABLY CONNECTIBLE VIDEO CAMERA VIDEO RECORDER

This is a continuation of application Ser. No. 208,340 filed Nov. 19, 1980 and now abandoned.

BACKGROUND OF THE INVENTION

1. Field of the Invention

This invention relates to a portable magnetic picture recording system including a video camera and a video tape recorder, and more particularly to an arrangement for coupling and coordinating the use of the video camera and the video tape recorder.

2. Description of the Prior Art

During the past few years, home video tape recorders have become remarkably widespread. In particular, minimization of bulk and size recently has achieved a great advance, for example, with the availability of compact video cameras to provide a portable magnetic picture recording system capable of taking and recording images of desired objects on location or the like.

Conventional portable magnetic picture recording systems are arranged with video tape recorders and video cameras, each of which are embodied in separate forms. When in use, they must be electrically connected together with one another by a cable. For this reason, during a picture taking and recording operation, the video tape recorder and the video camera must be carried about as separate units, while they are connected to each other by the cable. This is far more inconvenient to handle and manage than the conventional 8 mm cine cameras. Particularly, since it is common practice to suspend the video tape recorder from the operator's shoulder by a belt when the video camera is in use, because of the recorder's relatively heavy weight and large bulk, the recorder is then located far away from the video camera. Therefore, it has been very difficult to control the actuation of the video tape recorder, to check the voltage of its battery, to observe the remaining supply of fresh magnetic tape, and the like. These drawbacks can be eliminated by a unitary construction of the video camera and the video tape recorder. However, the following problems then arise.

For example, such construction leads to a large increase in the overall weight of the device and, therefore, in cases where the taking and recording of pictures occurs over a long time and covers a wide range of movement on the ground, the photographer's burden is increased. In such cases, the conventional arrangement where the relatively heavy video tape recorder is borne on the shoulder by a belt, to allow only the camera to be held at eye level when shooting, is more convenient. Further, since in the present state of the art, consideration is given to allow the video tape recorder to be able to record television signals (so-called "on-air" video recording), the unused video camera must still accompany the recorder even when the on-air video recording is taking place.

Another disadvantage is that it is impossible, even for those who already own a video tape recorder, to buy a separate mating video camera, and therefore they must buy the entire camera-recorder combined systems.

It will be understood from the foregoing that the conventional portable magnetic picture recording systems cannot be operated with any choice of various working modes to best suit a given situation. Therefore, up to now, the above problems have not been satisfactorily solved.

SUMMARY OF THE INVENTION

The present invention eliminates the above problems and drawbacks of the conventional systems, and provides a portable magnetic picture recording system which allows the selection of a mode best suited for a given photographing situation, as many different photographic situations may be encountered by the photographer.

Another object of the present invention is to provide a portable magnetic picture recording system which enables the photographer to suitably select a first working mode wherein the camera is attached to the recorder and they are used in unison as one device, and a second working mode wherein the camera and the recorder are used separated from each other, as necessity arises.

Still another object of the present invention is to provide a portable magnetic picture recording system having an effective connecting arrangement between the camera and the recorder.

To accomplish the above objects, according to one feature of the present invention, the video tape recorder is provided with a coupling or attachment portion for fixed engagement with the video camera, and it is at this coupling portion that the video camera is removably attached to the recorder. The coupling portion for fixed engagement with the video camera may be in the form of, for example, a recessed portion formed in the housing of the recorder so that a portion of the housing of the camera is received and fitted in the recessed portion.

The use of such construction makes it possible for the photographer to make an appropriate choice of either one of the first working mode, where the camera and the recorder are united as a single device, and the second working mode where the camera and the recorder are separated and used independently from one another. The present portable magnetic picture recording system thus can be operated in various modes according to a wide variety of photographing situations, as may be encountered.

The various features of novelty which characterize the invention are pointed out with particularity in the claims annexed to and forming a part of this disclosure. For a better understanding of the invention, its operating advantages and specific objects attained by its use, reference should be had to the accompanying drawing and descriptive matter in which there are illustrated and described preferred embodiments of the invention.

BRIEF DESCRIPTION OF THE DRAWING

In the drawing:

FIGS. 2(a)-(d) show different views of the video camera in the system of FIG. 1, wherein FIG. 2(a) is a top view.

FIGS. 3(a)-(b) show the video camera of FIGS. 2(a)-(d) attached to the video tape recorder, shown partially, to provide the system of FIG. 1, wherein

FI. 5 is a schematic view of an optical arrangement in the system of FIG. 1;

FIGS. 6(a)-(d) show different views of the video tape recorder in the system of FIG. 1, wherein

DETAILED DESCRIPTION OF THE INVENTION

Figure 1:
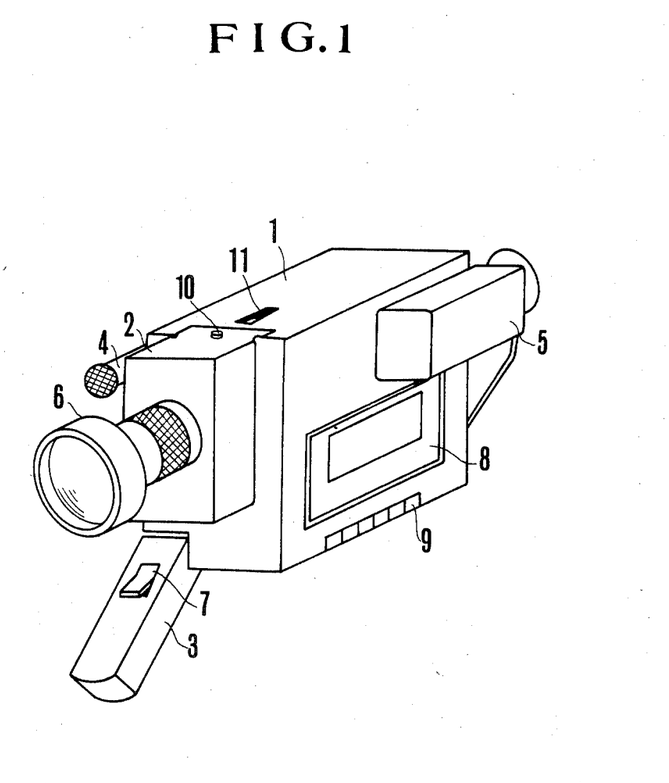
FIG. 1 is a perspective view, showing the outside of an embodiment of a portable magnectic picture recording system including a video camera and a video tape recorder according to the present invention.

FIG. 1 shows a video tape recorder 1 and a video camera 2 attached to the recorder 1 at a recessed portion 1a of the front panel of the recorder housing. A collapsible grip 3 is arranged on the bottom panel of the recorder 1 to be extended as shown in FIG. 1, when the video camera 2 is attached to the recorder 1. The grip 3 is provided with a recording start button 7. The video camera 2 has a taking or imaging lens 6 with a microphone 4 fixed on one side panel of the camera. The microphone 4 has an associated tubular casing which serves as a grip for the camera 2 when the camera is used in isolation or separated from the tape recorder 1.

A number of conventional control buttons 9 are arranged on the lower edge of one side panel of the recorder 1 to actuate a selected one of various operating modes, including recording, reproducing, fast feeding, and rewinding. Above these control buttons 9 is provided a chamber 8 for accomodating a conventional magnetic tape cassette. A conventional electronic finder 5 is mounted above the cassette chamber 8. The upper panel of the camera housing is provided with a lock releasing button 10, more fully described below, and a corresponding latch knob 11 which cooperates with the lock releasing button 10 is positioned at the front portion of the top panel of the recorder 1.

Since the video camera 2 is constructed to be detachable from the recorder 1, the camera 2 is shown in the detached state in FIGS. 2(a) to 2(d). As shown in these figures, the video camera 2 is provided with a pair of attachment guide means 2(a) and 2(b) in the form of concave grooves in opposite side panel walls of the camera housing. A ball-like sound collecting part 12 is formed at the front end of the tubular casing of the microphone 4, and a recording start button 13 is provided at the opposite end of the casing. The recording start button 13 is used only when the video camera 2 is detached from but still connected to the recorder 1. The depression of this button 13 acts to close a switch (not shown). This switch is connected in parallel to another switch (not shown) which is arranged to be closed when the recording start button 7 on the grip 3 of the recorder 1 (FIG. 1) is depressed. These switches each function as a conventional trigger switch for the recorder 1.

An image pick-up element 31 (FIG. 5) such as CCD (charge coupled device) is provided in the interior of the camera 2 in operative relationship with the taking lens 6, and an image receiving surface of the element 31 is illuminated with light from an object to be photographed. This object image light incident on the image receiving surface is converted to a video signal of a prescribed waveform by the image pick-up element 31, and by a conventional video signal forming circuit (not shown). A conventional beam splitter or optical system D is arranged between the taking lens 6 and the image pick-up element 31, so that a portion of the light passing through the taking lens 6 is split and directed to a conventional finder optical system F. A finder opening 14 for the optical finder system F is formed in the back panel of the camera housing, through which opening 14 the photographer can observe an object image formed by the light from the optical finder system F.

Figure 2A:
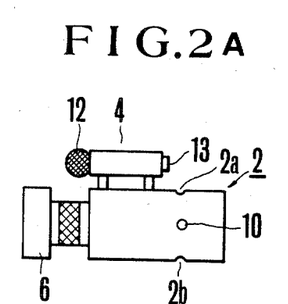
Figure 2B:
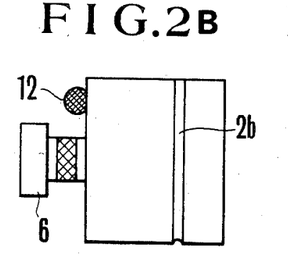
FIG. 2(b) is a side view.
Figure 2C:
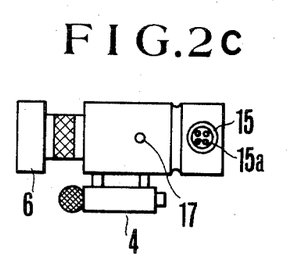
FIG. 2(c) is a bottom view.
Figure 2D:
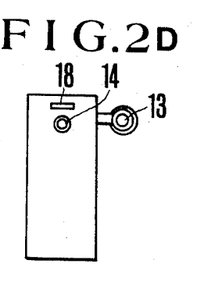
FIG. 2(d) is a rear view.

A locking hole 18 (FIG. 2(d)) is provided above the optical finder opening 14 and, on the bottom panel of the camera housing, a terminal portion 15 including a plurality of terminals 15a arranged to connect the recorder with the camera 2. The terminals 15a operate to transmit certain electrical signals including the video signal generated within the camera 2, and an actuating signal which is provided to the recorder 1 when the recording start button 13 is depressed to close its associated switch. Terminals 15a also receive the battery voltage and certain control signals from the recorder 1. A screw hole 17 is provided in the bottom of the camera housing for attachment of a tripod (not shown). The image pick-up element 31 in the form of a CCD, or other suitable solid state image pick-up device, is preferred for use in the present magnetic recording system, since the depth of the camera 2 can be minimized, and its weight also can be reduced.

Figure 3A:
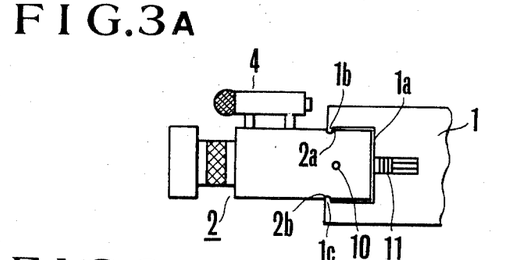
FIG. 3(a) is a top view showing essential elements of the system.
Figure 3B:
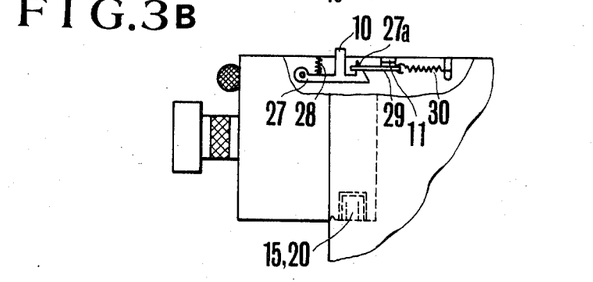
FIG. 3(b) is a side view with a portion broken away to show a locking mechanism.
Figure 6A:
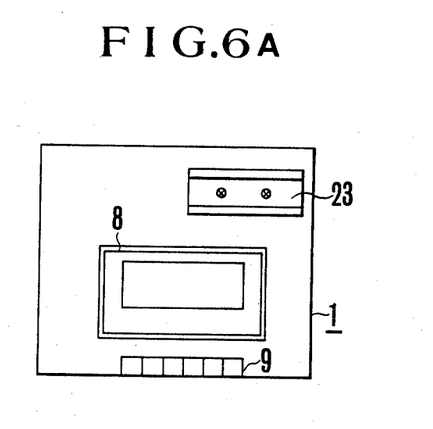
FIG. 6(a) is a side view.
Figure 6B:
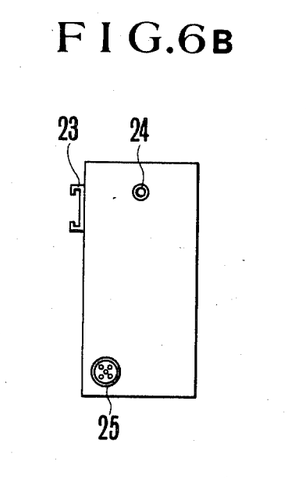
FIG. 6(b) is a rear view.
Figure 6C:
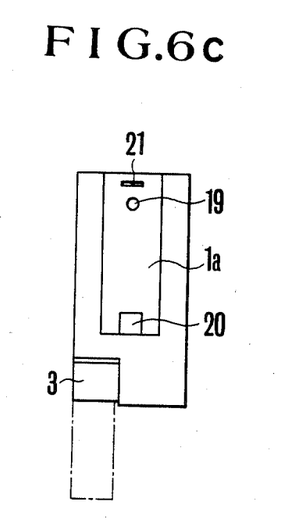
FIG. 6(c) is a front view.
Figure 6D:
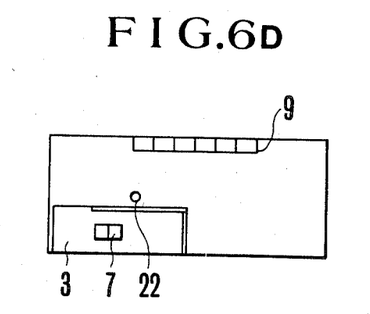
FIG. 6(d) is a bottom view.

FIGS. 3(a) and 3(b) illustrate details of the video camera 2 and the recorder 1 when attached to one another. A recessed portion 1a is formed in the recorder housing for attachment of the camera 2. A pair of projections 1b and 1c are provided at the front end portions of the side walls of the recessed portion 1a for engagement with corresponding guide grooves 2a and 2b in the camera housing. A connector portion 20, arranged to mate with the terminal portion 15 of the camera 2, is provided on the bottom wall of the recessed portion 1a. Also, the lock release button 10, provided in the camera 2, is fixed to a lock lever 27 arranged in the interior of the camera housing. This lock lever 27 has one end pivotally mounted on a base plate (not shown), and is urged by a spring 28 to turn in a counter-clockwise direction, as viewed in FIG. 3(b), so that a latch pawl 27a formed at the opposite end of lock lever 27 is held opposite the lock hole 18. In this condition, the lock release button 10 projects outwardly from the top panel of the camera housing. When the projected button 10 is depressed, the lock lever 27 is turned in a clockwise direction against the bias force of the spring 28. The latch knob 11 provided in the recorder 1, is formed unitarily with a slidingly movable latch member 29. The latch member 29 has one end portion provided with an engagement hole (not shown) for engagement with the latch pawl 27a of the camera 2, and is urged by a spring 30 to move to the right as viewed in FIG. 3(b). For this reason, latch member 29 is normally retracted so that its full length is in the interior of the recorder 1. When the latch knob 11 is slid to the left against the biasing force of the spring 30, its engagement end portion projects outwardly from an opening 21 shown in FIG. 6(c). The opening 21 of the recorder is formed to be opposite the lock hole 18 of the camera 2 when the camera is attached to the recorder 1. Therefore, after the camera 2 has been attached to the recorder 1 at the recessed portion 1a, and the latch knob 11 is moved to the left as viewed in FIG. 3(b) against the bias force of the spring 30, the latch pawl 27a of the camera 2 engages the engagement hole of the latch member 29. The camera 2 thus is set in a locked position with the recorder 1, and it is impossible for the camera 2 to be accidentally detached from the recorder 1.

When the camera 2 is to be attached to the recorder 1, the camera is placed in the recessed portion 1a of the recorder housing by aligning the pair of guide grooves 2a and 2b with the pair of projections 1b and 1c, and then pushing against the camera so that it slides into fitted relationship with the recorder. At the end of this sliding movement, the terminal portion 15 on the bottom surface of the camera 2 is in contact with the connector portion 20 of the recorder 1, so that the recorder 1 and the camera 2 are electrically connected with each other. When the camera 2 is to be detached from the recorder 1, the photographer need only push the lock release button 10 so that the engagement hole of the latch member 29 and the latch pawl 27a are released from their engagement by the action of the spring 30. In this state, the camera 2 can be moved upward away from the recorder 1.

Figure 5:
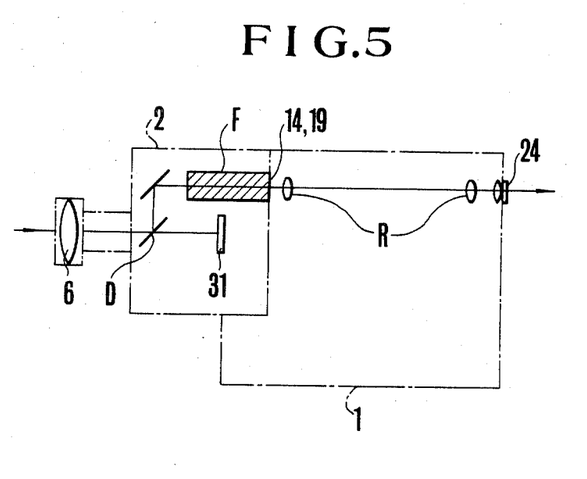

FIGS. 6(a) to 6(d) show the video tape recorder 1, including the coupling or attachment recessed portion 1a having the light receiving opening 19. This opening 19 is aligned with the finder opening 14 of the camera 2 when the camera is attached at the recessed portion 1a. A relay optical system R, as shown in FIG. 5, is provided in the interior of the recorder 1 in operative relationship with the opening 19 so that when the camera 2 is attached to the recorder 1, a portion of the light passing through the taking lens 6 is directed through the beam splitter optical system D, optical finder system F and openings 14 and 19 to the relay optical system R. The finder light image from the relay optical system R can then be observed through an eye-piece 24 at a finder opening in the recorder 1.

Figure 4:
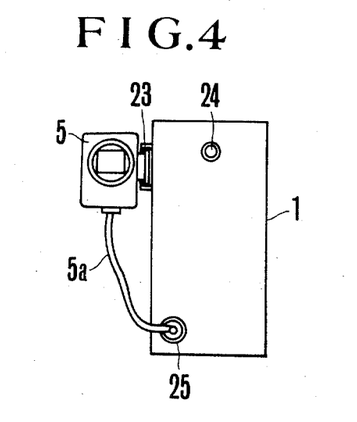
FIG. 4 is a rear view of the system of FIG. 1.

Another opening 21 is also provided above the light receiving opening 19 to permit the passage of the latch member 29. A shoe 23 (FIG. 6(b)) is provided for attachment of the electronic finder 5, and another connector portion 25 on the recorder housing is arranged to electrically connect the recorder with the electronic finder 5. FIG. 4 shows a working state of the recorder 1 with the electronic finder 5 attached to the recorder. The screw hole 22 (FIG. 6(d)) allows for attachment of the tripod (not shown).

The video tape recorder 1 includes a conventional tape loading mechanism (not shown) for pulling out magnetic tape contained in a cassette (not shown) when the cassette is loaded in the cassette chamber 8, to form a prescribed tape running path, and a conventional signal processing circuit (not shown) for recording picture signals with a predetermined format, sound signals, control signals and the like on the magnetic tape. The processing circuit also reads out and reproduces these signals from the magnetic tape, and operates to record, on the magnetic tape, picture signals supplied through the connector portion 20 from the video camera 2, and to reproduce the picture signals recorded on the magnetic tape and supplied through the connector portion 25 to the electronic finder 5. Moreover, the processing circuit monitors the picture signals recorded on the magnetic tape by the electronic finder 5, as the picture signals from the video camera 2 are supplied to the electronic finder 5.

In the portable magnetic picture recording system of the present invention, it is possible for the photographer to make a suitable choice of a first working mode wherein the camera 2 is attached to the recorder 1 so that they are used together as a unitary device, or a second working mode wherein the camera 2 and the recorder 1 are used while separated from each other.

For example, when the camera 2 is used while separated from the recorder 1, as in a conventional picture recording system, the camera 2 and the recorder 1 are electrically connected to each other by a cable (not shown) between the terminal portion 15 and the connector portion 20. In this case, the tubular casing on the camera 2, which houses the microphone 4, is used as a grip. When picture recording is to be performed, the particular one of the actuating buttons 9 which selects the recording mode is first operated, as in the conventional system, so that the recorder 1 is set in a picture recording condition. In this condition, when the recording start button 13 provided on the tubular microphone casing is depressed, a trigger signal is supplied to the recorder 1 similarly to the conventional system. The magnetic tape then starts to run, and picture signals generated in the camera 2 are recorded on the tape. By looking through the finder opening 14 of the camera 2, the photographer can view the object image.

When the camera 2 and the recorder 1 are used in the attached state, after the housing of the camera 2 has been slidingly fitted in the recessed portion 1a of the recorder 1, the latch knob 11 is operated to effect locking. By this attachment procedure, as discussed above, the terminal portion 15 is directly fitted in the connector portion 20, so that the recorder 1 and the camera 2 are electrically connected with each other without the use of a connecting cable.

Another advantage arising from the present arrangement wherein a portion of the camera housing is accomodated in the recessed portion 1a of the recorder is that the entire system can be constructed compactly. When the camera 2 is used while attached to the recorder 1, the grip 3 is extended out from the recorder housing to the projected position for supporting the system. When picture recording is to be performed, the recording mode selection button 9 is first operated to set the recorder 1 into the picture recording mode. In this mode, depressing the record start button 7 on the grip 3 causes a trigger signal to be provided to the recorder 1, thus initiating the running of the magnetic tape, and recording of the picture signals generated in the camera 2 on the tape as is known in the art. The photographer, looking through the eye-piece 24 at the finder opening in the recorder 1, then can recognize the object.

It is also possible that instead of using the optical finder, the electronic finder 5 is used to recognize the object. In such case, the electronic finder 5 is attached to the recorder 1 by the attachment shoe 23, and a connecting cable 5a provided on the electronic finder 5 is connected to the connector portion 25. Since the bottom of the recorder 1 is provided with the tripod attachment hole 22, picture recording then can be performed with the recorder mounted on the tripod.

Figure 7:
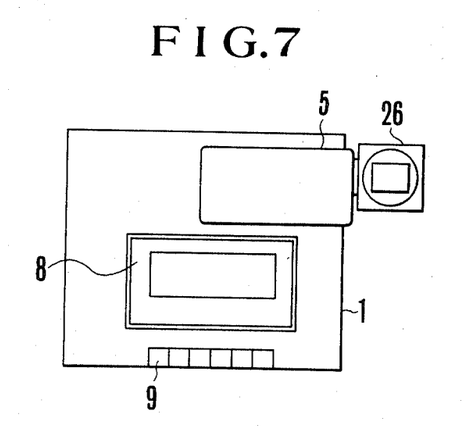
FIG. 7 is a side view of a modified version of the system of FIG. 1, which can be used as a reproducing device.

When the images recorded by the recorder 1 are to be reproduced, the camera 2 is separated from the recorder 1 and, as shown in FIG. 7, an inclined reflection mirror unit 26 is attached to the side of the electronic finder 5 on which images are projected. Therefore, by the use of the electronic finder 5, it is possible to observe the reproduced images while the operating surfaces of the control buttons 9 face the viewer.

While specific embodiments of the invention have been shown and described in detail to illustrate the application of the inventive principles, it will be understood that the invention may be embodied otherwise without departing from such principles.

What is claimed is:

1. A portable video recording system, comprising:
(a) a video camera including a camera housing,
    image pick-up means for transducing an object image into an electrical signal,
    a first finder opening for observing the object image,
    a first optical system for introducing the object image to the pick-up means, and
    a second optical system for introducing the object image to the first finder opening;
(b) a video recorder including,
    a recorder housing having a mounting part to mount said camera housing to said recorder housing thereon in a freely attachable and detachable manner,
    a relay optical system,
    a relay opening provided at one end of the relay optical system, and
    a second finder opening provided at the other end of the relay optical system; and
(c) transmission means for transmitting the electrical signal to the recorder when the camera is attached to the recorder,
wherein the image of the object is observable through the first finder opening, the relay opening and the relay optical system when the camera is attached to the recorder.

2. A video recording system according to claim 1, said video camera further comprising a first actuating member for actuating said recording means, and said video recorder further comprising a second actuating member for actuating said recording means, wherein when said camera housing is mounted on said recorder housing, said recording means is actuated by said second actuating member.

3. A video recording system, comprising:
(a) a video camera including,
    a camera housing having a mechanical coupling part,
    an optical system for picking up an object image, and
    a first output portion for producing a corresponding image pick-up signal; and
(b) a video recording and reproducing apparatus having recording and reproducing functions, including
    an apparatus housing having a first mounting part to mount said camera housing to said apparatus housing in a freely attachable and detachable manner,
    a receiving portion to receive said image pick-up signals from said first output portion, and
    a second output portion for putting out said image pick-up signal received at said receiving portion and for putting out a reproduced signal obtained through reproduction of a recorded signal; and
(c) an image displayer detachably mountable on said apparatus housing, said displayer being arranged to be electrically connected with said second output portion to display an image in response to said image pick-up signal and to said reproduced signal;
    said apparatus housing further having a second mounting part to mount said displayer on said apparatus housing in a freely attachable and detachable manner;
    said camera housing includes first panel walls, said apparatus housing includes second panel walls, said mounting part is in the form of a recess in one of said second panel walls of said apparatus housing which recess accommodates at least a portion of said camera housing, said video camera and said apparatus each further includes lock means for engaging one another so that said video camera is locked to said apparatus,
    therein when said camera housing is mounted on said apparatus housing, said first mounting part couples to said part mechanically,
    said first output portion and said receiving portion are directly connected electrically with one another, and said displayer displays the image in response to said image pick-up signal when the camera picks up an image, while displaying the image in response to said reproduced signal when the apparatus reproduces the recorded signal.

4. A video recording system, according to claim 3, further comprising a threaded opening in said camera housing to mount the system on a tripod.

5. A video recording system according to claim 3, wherein said apparatus housing includes a side wall which defines a part of said recess and a projection on said side wall in the vicinity of the outside surface of said apparatus housing, and one of said first panel walls of said camera housing has a guide groove for engagement with said projection to secure said camera housing to said apparatus housing.

6. A video recording system according to claim 3, wherein either one of said video camera and said apparatus further includes releasing means for releasing said lock means when said video camera is locked to said apparatus.

* * * * *